United States Patent [19]

Asai et al.

[11] Patent Number: 5,268,409
[45] Date of Patent: Dec. 7, 1993

[54] AROMATIC POLYSULFONE RESIN COMPOSITION

[75] Inventors: Kuniaki Asai, Tondabayashi; Kazuo Hieda, Nishinomiya; Tadayasu Kobayashi, Tsukuba, all of Japan

[73] Assignee: Sumitomo Chemical Company, Limited, Osaka, Japan

[21] Appl. No.: 731,357

[22] Filed: Jul. 15, 1991

Related U.S. Application Data

[63] Continuation of Ser. No. 444,975, Dec. 4, 1989, abandoned.

[30] Foreign Application Priority Data

Jan. 23, 1989 [JP] Japan .................. 1-14635

[51] Int. Cl.⁵ .............................................. C08K 3/00
[52] U.S. Cl. ................................. 524/424; 524/435; 524/437; 524/450; 524/609
[58] Field of Search .................... 524/424, 450, 609

[56] References Cited

U.S. PATENT DOCUMENTS

| | | | |
|---|---|---|---|
| 4,528,346 | 7/1985 | Sugie et al. | 525/537 |
| 4,529,769 | 7/1985 | Johnson et al. | 524/413 |
| 4,668,719 | 5/1987 | Kato et al. | 524/401 |
| 4,678,831 | 7/1987 | Kawabata et al. | 525/537 |
| 4,843,113 | 6/1989 | Tatsukami et al. | 524/424 |
| 4,873,283 | 10/1989 | Satake et al. | 524/520 |

FOREIGN PATENT DOCUMENTS

| | | | |
|---|---|---|---|
| 0129805 | 7/1985 | European Pat. Off. | |
| 266791 | 5/1988 | European Pat. Off. | 524/424 |
| 57-80444 | 5/1982 | Japan . | |
| 59-230052 | 12/1984 | Japan | 524/424 |
| 60-186561 | 9/1985 | Japan . | |
| 120856 | 6/1986 | Japan | 524/424 |
| 61-120856 | 6/1986 | Japan . | |
| 62-167356 | 7/1987 | Japan . | |
| 62-295956 | 12/1987 | Japan . | |
| 20352 | 1/1988 | Japan . | |

OTHER PUBLICATIONS

Handbook of Separation Process Technology, 1987, pp. 644-647.
Database WPIL, No. 89-057324, Derwent Publications Ltd., London, GB; & JP-A-1 009 234 (Chugoku Pearl Hanba) Dec. 1, 1989.

Primary Examiner—John C. Bleutge
Assistant Examiner—Mark Sweet
Attorney, Agent, or Firm—Stevens, Davis, Miller & Mosher

[57] ABSTRACT

The aromatic polysulfone resin composition of the present invention can be produced by mixing 100 parts by weight of an aromatic polysulfone resin and 0.1 to 5 parts by weight of a hydrotalcites and/or a zeolite. Molded articles formed of said composition have a mechanical strength and heat resistance inherent to its constituent resin, and generate low-boiling gases and corrosive gases very little. Therefore, the composition of the present invention is best suited for relay parts.

16 Claims, No Drawings

AROMATIC POLYSULFONE RESIN COMPOSITION

This application is a continuation of application Ser. No. 444,975, filed Dec. 4, 1989 now abandoned.

This invention relates to an aromatic polysulfone resin composition capable of giving a molded article which generates gases very little and is suitable as a relay part.

Aromatic polysulfone resins are amorphous resins. Hence they have isotropy and a small mold shrinkage factor. Since they also have a higher glass transition point than polyphenylene sulfide resins, polyether ketone resins, etc., the aromatic polysulfone resins maintain their physical properties, such as strength, modulus of elasticity, resistance to creep, etc. up to higher temperatures than polyphenylene sulfide resins or polyetherketone resins. This advantage makes the aromatic polysulfone resins a material suitable for electronic parts to which a high dimensional accuracy and high resistance to heat are required.

Further incorporating fibrous materials, such as a glass fiber, etc., into the aromatic polysulfone resins gives a composition having a small mold shrinkage factor and an improved strength and modulus of elasticity. Such a composition is more suitable as a material for electronic parts than aromatic polysulfone alone, and it is used, for example, in a relay, switch, connector, socket, coil bobbin, etc.

However, the aromatic polysulfone resin have a relatively high viscosity when melted. For this reason, injection molding of the aromatic polysulfone resins into electronic parts having a small size and a complicated form or into electronic parts having a thin wall portion requires a higher molding temperature, injection pressure and injection speed than those usually employed. The aromatic polysulfone resins hence generate gases by decomposition when injection-molded, and part of the gases are sometimes loaded into molded articles. The gases sometimes cause various problems on the electronic parts depending upon the conditions that the parts are actually used.

Specifically, relay-constituting electronic parts (case, base, armature, coil bobbin, etc.) have a problem that when even a small amount of the loaded gases are generated from a molded article, the molded article is carbonized by the action of an arc of a contact switch, and a carbonization product is deposited around the metallic contact point of the switch to cause an insulation failure. Further, if the generated gas is corrosive, the metallic contact point is corroded.

Gas chromatography mass spectrometry, etc., have already given data that a molded article composed mainly of an aromatic polysulfone resin generates corrosive gases containing Cl and $SO_2$ and noncorrosive, low-boiling gases such as aliphatic hydrocarbons, aromatic hydrocarbons, acetone, alcohols, etc. Clearly, the corrosive gases are derived from the components or impurities of aromatic polysulfone resins, and they have been generated by thermal decomposition at molding and loaded into the molded article. However, the mechanism of generation of the above low-boiling gases is not clear.

It is certainly known that the amount of corrosive gases generated by decomposition of aromatic polysulfone resins at molding is much smaller than polyphenylene sulfide resins, and that the amount of various gases loaded into a molded article is also very small in aromatic polysulfone resins as compared to polyphenylene sulfide resins. However, aromatic polysulfone resins have not yet been satisfactory for use as parts in a relay. It is general practice at present, therefore, to use a molded article mainly composed of the aromatic polysulfone resin as a relay part after the loaded gases have been sufficiently removed from the molded article by vacuum baking treatment at a temperature between 150° C. and 200° C. It is hence required to omit the vacuum baking treatment, or shorten the time therefor even if it cannot be omitted. For this reason, there has been desired a molding composition capable of giving a molded article which generates gases very little, i.e. which are loaded with an extremely low amount of gases.

It is an object of this invention to provide an aromatic polysulfone resin composition capable of giving a molded article which generates gases very little and is suitable as a relay part.

According to the present invention, there is provided an aromatic polysulfone resin composition comprising 100 parts by weight of an aromatic polysulfone resin and 0.1 to 5 parts by weight of a hydrotalcite and/or a zeolite.

It has been well known from JP-B-58-36012 that hydrotalcites catch halogen generated by decomposition of a halogen-containing resin and stabilize the resin. Further, JP-A-60-186561, JP-A-61-120851, etc., disclose that hydrotalcites catch corrosive gases such as $SO_2$ gas and $H_2S$ gas generated by decomposition of polyphenylene sulfide (PPS) and that they catch and stabilize electrolytic impurities such as $Na^+Cl^-$ contained in PPS. On the other hand, JP-A-62-167356, JP-A-62-295956, etc. disclose that zeolites also catch the above gases generated by decomposition of PPS. According to the teachings of the above references, it has been therefore predictable that hydrotalcites or zeolites catch Cl-based and $SO_2$-based corrosive gases when these components are incorporated into a molding composition mainly composed of an aromatic polysulfone resin. However, it has never been expected that these components catch low-boiling gases of aliphatic hydrocarbons, aromatic hydrocarbons, acetone, alcohols, etc., as well, whereby the amount of gases from a molded article is almost completely prevented.

The polysulfone resin usable in the present invention stands for a polyarylene compound in which arylene units are arranged at random or in order with ether bonds and sulfone bonds. Specific examples are compounds having any of the following repeating units.

(1) 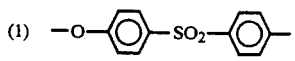

(2) 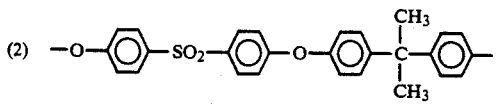

(3) 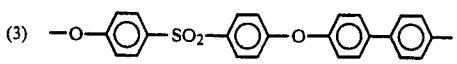

(4) 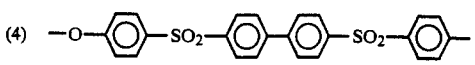

Of the above compounds, preferable is a polysulfone resin having the repeating unit (1), and this polysulfone resin is commercially available as VICTREX® PES 3600P, 4100P and 4800P from ICI.

The hydrotalcites usable in the present invention stand for a compound represented by the formula

wherein M is a divalent metal such as Mg, Mn, Fe, Co, Ni, Cu, Zn, etc., M' is a trivalent metal such as Al, Fe, Cr, Co, etc., A is OH, halogen, $CO_3$, $SO_4$, $NO_3$ or the like, x is a positive number equal to or smaller than 1, m is a number of moles of a hydrate, and n is a number equal to the valence of the anion A. The most easily available hydrotalcites are magnesium-aluminum hydroxy carbonate hydrates, and commercially available are DHT-4A having a structure of $Mg_{4.5}Al_2(OH)_{13}CO_3.3.5H_2O$ and its anhydride DHT-4A-2 (both manufactured by Kyowa Chemical Industry Co., Ltd.).

The zeolites usable in the present invention stand for crystalline hydrous aluminosilicates containing alkali and alkaline earth metals, and are represented by the formula $M_2O.Al_2O_3.nSiO_2.mH_2O$ or $M'O.Al_2O_3.nSiO_2.mH_2O$ in which M is an alkali metal such as Li, Na, K, etc., M' is an alkaline earth metal such as Ca, Mg, Ba, Sr, etc., m is a number of moles of the hydrate, and n is a number of moles of $SiO_2$.

Further, into the composition of the present invention may be incorporated as required fibrous reinforcing materials such as glass fibers, silica alumina fibers, wollastonite, carbon fibers, potassium titanate fibers, etc.; inorganic fillers such as calcium carbonate, talc, mica, clay, glass beads, etc.; mold release improvers such as polytetrafluoroethylene and metallic soaps typically represented by barium stearate, etc.; and colorants such as dyes, pigments, etc. In order to make the composition of the present invention particularly suitable for electronic parts, it is preferable to use glass fibers, silica alumina fibers, wollastonite or potassium titanate fibers as a reinforcing material in view of the dimensional accuracy, strength and modulus of elasticity. For electronic parts having a small size and complicated form or electronic parts having a thin wall portion, it is preferable to further incorporate metallic soaps, etc., in order to improve the releasability from a mold at the time of molding. The amount of the fibrous reinforcing material is not critical, but it is usually not more than 50 parts by weight, preferably not more than 30 parts by weight per 100 parts by weight of the aromatic polysulfone resin.

The composition of the present invention comprises 0.1 to 5 parts by weight, preferably 0.2 to 5 parts by weight of a hydrotalcite and/or zeolite based on 100 parts by weight of the aromatic polysulfone resin. The amount of hydrotalcite or zeolite less than 0.1 part by weight cannot prevent gases from generating from the molded article. Even when more than 5 parts by weight of a hydrotalcite or zeolite is added, the effect of decreasing an amount of gases from the molded article is not improved any further, but the mechanical strength of the molded article is degraded.

The means of mixing the above materials for the composition of the present invention is not critical. In general, a Henschel mixer, tumbler, or the like is used to mix an aromatic polysulfone resin with a hydrotalcite and/or zeolite with further incorporating reinforcing materials such as glass fibers, etc., a mold releasing improver such as metallic soaps, etc., and the like as required, and then the resultant mixture is melted and kneaded with an extruder.

The present invention will be further illustrated in the following Examples, which, however, shall not limit the present invention. In addition, in Examples, the amount of gases generated from the molded article and various physical properties of the article were measured in the following methods.

(1) Relative retention volume of low-boiling gases generated from the molded article An aromatic polysulfone composition was molded into a plane plate having a length of 64 mm, a width of 64 mm and a thickness of 1 mm with injection molding machine (PS40E5ASE, manufactured by Nissei Jushi Kogyo) conditioned to a cylinder temperature of 360° to 370° C. and a mold temperature of 150° C. The obtained plane plate was cut into chips having a length of 5 mm, a width of 5 mm and a thickness of 1 mm. 4 Grams of the chips were exactly weighed, washed with distilled water and then put into a vacuum-dried 25 cc vial bottle. This bottle was sealed with packing of polytetrafluoroethylene, and then heated in a hot-air-circulating drier set at 120° C. for 20 hours to allow the chips to generate gases. This vial bottle was placed in a head space gas chromatograph (GC-9A/HSS-2A, manufactured by Shimadzu Corporation) while it was kept at 120° C. 8 Microliters of the gases generated in the bottle was introduced to the column of a gas chromatograph. And 10 minutes after the introduction, analysis was stopped. The detector of the gas chromatograph was FID. The sensitivity of the detector was set at "range×10". Nitrogen was used as a carrier gas. 10% PEG 6000 Uniport HP 60/80 mesh was used as a filler in the column.

Signals from the detector were totalized through a microcomputer, and outputted as a relative retention volume.

According to the above procedure, the amount of gases generated within a retention time of 10 minutes were analyzed. Gas chromatography-mass spectrometer analysis carried out in advance showed that the contents of gases generated within a retention time of 10 minutes were aliphatic hydrocarbons, aromatic hydrocarbons (e.g. benzene and toluene), alcohols (e.g. methanol), acetone, etc.

In Examples, the total of relative retention volumes of gases generated within a retention time of 10 minutes is defined as "a relative retention volume of low-boiling gases". Needless to say, a large value for the relative retention volume of low-boiling gases means that a large amount of low-boiling gases are generated from the chips. Thus, it is sufficient to compare the values of relative retention volume of low-boiling gases between Examples.

In this connection, all the detectors slightly output signals even in a pure carrier gas. A background value of the gas chromatograph used in Examples was measured by using an empty vial bottle to show a value of 10,000.

(2) Degree of Cl- and $SO_2$-based Corrosive Gases Generated from the Molded Article Six grams of the chips prepared in the above (1) were exactly weighed and put into a 20 cc vial bottle. An about 8 by 8 mm square Ag plate, which had been consecutively polished with an emery paper and an $Al_2O_3$ paste and washed, was placed on the chips, and the bottle was sealed with packing of polytetrafluoroethylene. The vial bottle was heated in a hot-air-circulating drier set at 150° C. for 120 hours, and then the Ag plate was taken out. The Ag plate was analyzed by using an ESCA spectrometer SSX-100 (manufactured by SSI) to determine a ratio of $Cl_{2p}$ peak to $Ag_{3d5/2}$ peak (Cl/Ag) and a ratio of $S_{2p}$ peak to $Ag_{3d5/2}$ peak (S/Ag). These data were taken as an index for a degree of corrosion caused on the Ag plate by the Cl- and $SO_2$-based gases. A great value for this index means that a large amount of the corrosive gases were generated. In addition, when no chips were put into a vial bottle, i.e. when the test was carried out with an Ag plate alone, the values for Cl/Ag and S/Ag were 0.03 and 0.00, respectively.

(3) Tensile Strength and Heat-distortion Temperature

A sample was molded at a cylinder temperature of 340° to 350° C. and a mold temperature of 130° C. to obtain a test piece of ASTM No. 4 dumbbel and a test piece having a length of 127 mm, a width of 12.7 mm and a thickness of 6.4 mm. These test pieces were used to measure tensile strength and heat-deformation temperature according to ASTM D-638 and ASTM D-648.

EXAMPLES 1 TO 8 AND COMPARATIVE EXAMPLES 1 TO 5

An aromatic polysulfone resin powder (3600P, manufactured by ICI), a glass fiber (MAPXl, manufactured by Asahi Fiber Glass) and any of a hydrotalcite having a structure of $Mg_{4.5}Al_2(OH)_{13}CO_3$ (DHT-4A-2, manufactured by Kyowa Chemical Industry Co., Ltd.) and a zeolite having a structure of $Na_2O.Al_2O_3.3SiO_2.mH_2O$ (manufactured by Nakarai Chemical) were mixed in a mixing ratio as shown in Table 1 with a Henschel Mixer. The obtained mixture was granulated with a twin-screw extruder (PCM-30, manufactured ed by Ikegai Iron Works) at a cylinder temperature of 330° to 350° C. to give an aromatic polysulfone resin composition. Similarly, an aromatic polysulfone resin composition containing neither hydrotalcite nor zeolite was obtained (Comparative Example 1).

These compositions were injection-molded to obtain molded articles. These molded articles were used to measure a relative retention volume of low-boiling gases generated from the molded articles, a degree of Cl- and $SO_2$-based corrosive gases generated from the molded articles, tensile strength and heat-distortion temperature according to the above-detailed methods. Table 1 shows the results. The relative retention volumes of generated low-boiling gases and values of Cl/Ag and S/Ag for degrees of corrosion were much lower in molded articles obtained from hydrotalcite or zeolite-containing aromatic polysulfone resin compositions of the present invention (Examples 1–8) than in a molded article obtained from an aromatic polysulfone resin composition containing neither hydrotalcite nor zeolite (Comparative Example 1). That is, it is clear that the amounts of gases from the molded articles obtained from the compositions of the present invention have been reduced. In contrast, concerning the compositions containing less than 0.1 part by weight of a hydrotalcite or zeolite (Comparative Examples 2 and 4), the relative retention volume of gases from a molded article was unsatisfactorily reduced. Concerning the compositions containing more than 5 parts by weight of a hydrotalcite or zeolite (Comparative Examples 3 and 5), the relative retention volume of gases from a molded article was nearly equal to those of compositions containing 4 parts by weight of a hydrotalcite or zeolite (Examples 4 and 8). In addition, the tensile strength of compositions of Comparative Examples 3 and 5 was degraded to a great extent. The heat-distortion temperatures have also been lowered slightly.

EXAMPLES 9 TO 11 AND COMPARATIVE EXAMPLE 6

The same procedure as in Example 1 was repeated for evaluating the properties of aromatic polysulfone resin compositions containing 100 parts by weight of an aromatic polysulfone resin powder (4100P, manufactured by ICI) and 1.0 part by weight of one member out of the same hydrotalcite as in Example 1, the same zeolite as in Example 5 and a hydrotalcite having a structure of $Mg_{4.5}Al_2(OH)_{13}CO_3.3.5H_2O$ (DHT-4A, manufactured by Kyowa Chemical Industry Co., Ltd.). Table 2 shows the results together with that of an aromatic polysulfone resin containing neither hydrotalcite nor zeolite (Comparative Example 6). The relative retention volumes of gases from molded articles obtained from hydrotalcite or zeolite-containing aromatic polysulfone resins of the present invention have been remarkably decreased.

TABLE 1

| | Composition of molding material | | | | Relative retention volume of low-boiling gases | Degree of corrosive gases | | Tensile strength ($kg/cm^2$) | Heat-distortion temperature (°C.) |
| | Aromatic polysulfone (part by weight) | Glass fiber (part by weight) | Hydrotalcites or zeolites | | | | | | |
| | | | kind | Part by weight | | Cl/Ag | S/Ag | | |
| --- | --- | --- | --- | --- | --- | --- | --- | --- | --- |
| Comparative Example 1 | 100 | 25 | — | — | 470,000 | 0.53 | 0.23 | 1290 | 213 |
| Example 1 | 100 | 25 | Hydrotalcite DMT-4A-2 | 0.3 | 205,000 | 0.09 | 0.06 | 1210 | 210 |
| Example 2 | 100 | 25 | Hydrotalcite DMT-4A-2 | 1.0 | 210,000 | 0.08 | 0.04 | 1180 | 210 |
| Example 3 | 100 | 25 | Hydrotalcite DMT-4A-2 | 2.5 | 180,000 | 0.06 | 0.03 | 1140 | 209 |
| Example 4 | 100 | 25 | Hydrotalcite DMT-4A-2 | 4.0 | 150,000 | 0.05 | 0.03 | 1090 | 209 |
| Comparative Example 2 | 100 | 25 | Hydrotalcite DMT-4A-2 | 0.05 | 420,000 | 0.47 | 0.21 | 1270 | 211 |
| Comparative Example 3 | 100 | 25 | Hydrotalcite | 7.0 | 160,000 | 0.05 | 0.03 | 930 | 207 |

TABLE 1-continued

| | Composition of molding material | | | | Relative retention volume of low-boiling gases | Degree of corrosive gases | | Tensile strength (kg/cm²) | Heat-distortion temperature (°C.) |
|---|---|---|---|---|---|---|---|---|---|
| | Aromatic polysulfone (part by weight) | Glass fiber (part by weight) | Hydrotalcites or zeolites | | | | | | |
| | | | kind | Part by weight | | Cl/Ag | S/Ag | | |
| Example 5 | 100 | 25 | DMT-4A-2 Zeolite | 0.3 | 230,000 | 0.17 | 0.13 | 1220 | 211 |
| Example 6 | 100 | 25 | " | 1.0 | 250,000 | 0.12 | 0.10 | 1240 | 211 |
| Example 7 | 100 | 25 | " | 2.5 | 200,000 | 0.10 | 0.09 | 1200 | 210 |
| Example 8 | 100 | 25 | " | 4.0 | 170,000 | 0.08 | 0.07 | 1150 | 210 |
| Comparative Example 4 | 100 | 25 | " | 0.05 | 435,000 | 0.50 | 0.22 | 1280 | 212 |
| Comparative Example 5 | 100 | 25 | " | 7.0 | 165,000 | 0.07 | 0.07 | 1010 | 208 |

TABLE 2

| | Composition of molding material | | | Relative retention volume of low-boiling gases | Degree of corrosive gases | | Tensile strength (kg/cm²) | Heat-distortion temperature (°C.) |
|---|---|---|---|---|---|---|---|---|
| | Aromatic polysulfone (part by weight) | Hydrotalcites or zeolites | | | | | | |
| | | Kind | Part by weight | | Cl/Ag | S/Ag | | |
| Comparative Example 6 | 100 | — | — | 380,000 | 0.48 | 0.20 | 860 | 203 |
| Example 9 | 100 | Hydrotalcite DMT-4A | 1.0 | 190,000 | 0.08 | 0.04 | 820 | 201 |
| Example 10 | 100 | Hydrotalcite DMT-4A-2 | 1.0 | 170,000 | 0.06 | 0.03 | 830 | 203 |
| Example 11 | 100 | Zeolite | 1.0 | 200,000 | 0.09 | 0.09 | 840 | 203 |

The aromatic polysulfone resin composition of the present invention gives molded articles which generate low-boiling gases and corrosive gases very little, and has a mechanical strength and heat resistance inherent to the aromatic polysulfone resin as a component. Thus, the composition of the present invention is highly useful for relay parts.

We claim:

1. An aromatic polysulfone resin composition consisting essentially of 100 parts by weight of an aromatic polysulfone resin which has at least one repeating unit selected from the group consisting of (1) 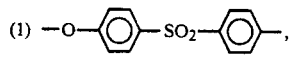

(2) 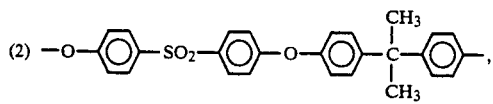

(3) 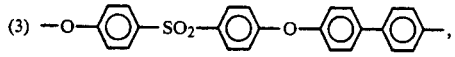

and (4) 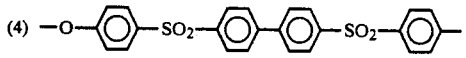

and 0.1 to 5 parts by weight of at least one member selected from the group consisting of hydrotalcite and zeolite.

2. A composition according to claim 1, which further comprises a fibrous reinforcing material.

3. A composition according to claim 2, which comprises as the fibrous reinforcing material at least one member selected from the group consisting of glass fibers, silica alumina fibers, wollastonites and potassium titanate fibers.

4. A composition according to claim 1, which further comprises a mold release improver.

5. A composition according to claim 1, wherein the aromatic polysulfone resin has the repeating unit

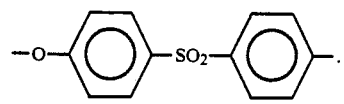

6. A composition according to claim 1, wherein the hydrotalcite or zeolite is one member selected from the group consisting of
$Mg_{4.5}Al_2(OH)_{13}CO_3$,
$Mg_{4.5}Al_2(OH)_{13}CO_3.3.5H_2O$ and
$Na_2O.Al_2O_3.3SiO_2.mH_2O$.

7. A composition according to claim 1, which comprises 0.2 to 5 parts by weight of a hydrotalcite or zeolite per 100 parts by weight of the aromatic polysulfone resin.

8. A composition according to claim 2, which comprises not more than 50 parts by weight of the fibrous reinforcing material per 100 parts by weight of the aromatic polysulfone resin.

9. A composition according to claim 2, which comprises not more than 30 parts by weight of the fibrous reinforcing material per 100 parts by weight of the aromatic polysulfone resin.

10. A composition according to claim 2, wherein the fibrous reinforcing material is a glass fiber.

11. A relay part formed by molding the composition according to claim 1.

12. An aromatic polysulfone resin composition consisting essentially of 100 parts by weight of an aromatic polysulfone resin which has at least one repeating unit selected from the group consisting of

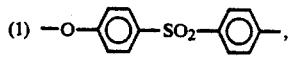,

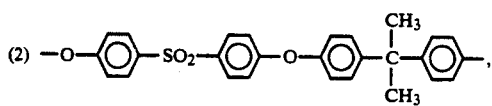,

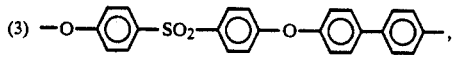, and

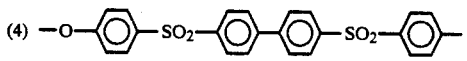

and 0.1 to 5 parts by weight of hydrotalcite.

13. An aromatic polysulfone resin composition according to claim 1, wherein the amount of the at least one member selected from the group consisting of hydrotalcite and zeolite is between 0.3 parts by weight and 4.0 parts by weight.

14. An aromatic polysulfone resin composition according to claim 12, wherein the amount of the at least one member selected from the group consisting of hydrotalcite and zeolite is between 0.3 parts by weight and 4.0 parts by weight.

15. A method for reducing generation of low-boiling gases and corrosive gases at the time of injection-molding of an aromatic polysulfone composition which comprises incorporating 0.1 to 5 parts by weight of at least one member selected rom the group consisting of hydrotalcite and zeolite per 100 parts by weight of an aromatic polysulfone resin which as at least one repeating unit selected from the group consisting of (1) 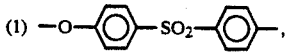, (2) 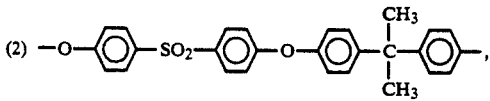, (3) 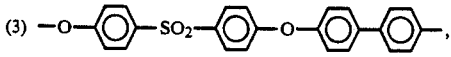, and (4) 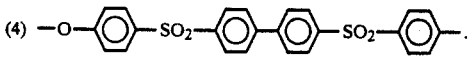.

16. The method of claim 15, wherein the at least one member is hydrotalcite.

* * * * *